US008928981B2

(12) United States Patent
Whitehead

(10) Patent No.: US 8,928,981 B2
(45) Date of Patent: Jan. 6, 2015

(54) SUNLIGHT REDIRECTING MIRROR ARRAYS

(75) Inventor: Lorne A. Whitehead, Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 14/349,894

(22) PCT Filed: Sep. 13, 2012

(86) PCT No.: PCT/CA2012/000854
§ 371 (c)(1),
(2), (4) Date: Apr. 4, 2014

(87) PCT Pub. No.: WO2013/059908
PCT Pub. Date: May 2, 2013

(65) Prior Publication Data

US 2014/0247494 A1 Sep. 4, 2014

Related U.S. Application Data

(60) Provisional application No. 61/551,050, filed on Oct. 25, 2011.

(51) Int. Cl.

| | |
|---|---|
| ***G02B 17/00*** | (2006.01) |
| ***G02B 27/00*** | (2006.01) |
| ***F21S 11/00*** | (2006.01) |
| ***E06B 9/24*** | (2006.01) |
| ***E04D 13/03*** | (2006.01) |
| ***F21V 5/02*** | (2006.01) |
| ***E06B 9/386*** | (2006.01) |

(52) U.S. Cl.

CPC ............... *F21S 11/007* (2013.01); *F21S 11/00* (2013.01); *E06B 9/24* (2013.01); *E04D 13/03* (2013.01); *F21V 5/02* (2013.01); *F21S 11/002* (2013.01); *E06B 9/386* (2013.01); *E06B 2009/2417* (2013.01)

USPC ........... 359/592; 359/593; 359/596; 359/597; 359/850

(58) Field of Classification Search

CPC ................................ F21S 11/00; F21S 11/002

USPC .......................... 359/592–593, 596–597, 850

See application file for complete search history.

(56) References Cited

U.S. PATENT DOCUMENTS

| | | | | |
|---|---|---|---|---|
| 721,258 | A * | 2/1903 | Wadsworth | 359/592 |
| 3,709,583 | A * | 1/1973 | Pfannkuch et al. | 359/593 |
| 4,820,020 | A * | 4/1989 | Terrill | 359/592 |
| 5,285,315 | A * | 2/1994 | Stiles | 359/592 |
| 8,000,014 | B2 * | 8/2011 | Whitehead et al. | 359/592 |
| 8,723,092 | B2 * | 5/2014 | Bartenbach | 250/203.4 |

FOREIGN PATENT DOCUMENTS

| | | |
|---|---|---|
| WO | 2009/000070 | 12/2008 |
| WO | 2011/012301 | 2/2011 |

* cited by examiner

*Primary Examiner* — Christ Mahoney

(74) *Attorney, Agent, or Firm* — Oyen Wiggs Green & Mutala LLP

(57) ABSTRACT

Sunlight redirector (30) incorporates closely proximate mirror arrays (32, 34) having parallel, uniformly spaced, longitudinal mirror segments (38, 44). Prismatic sheet (36) is positioned behind and closely proximate second array (34). Segments (38) extend in first direction (x). Segments (44) extend in second direction (y) perpendicular to direction (x) segments (38, 44)have normal vectors (42, 48). Segments (38) are interconnected for simultaneous pivotal movement (40), such that their normal vectors (42) remain parallel. Segments (44) are interconnected for simultaneous pivotal movement (46), such that their normal vectors (48) remain parallel. Arrays (32, 34) redirect incident light toward sheet (36), which redirects the light into a desired fixed direction, e.g. parallel to the sunlight redirect's normal vectors (50). Segments (38, 44) may have inward and outward segments (60A, 60B) which can be adjustably positioned to maximize redirection of incident sunlight rays in a desired direction.

14 Claims, 4 Drawing Sheets

SUNLIGHT REDIRECTING MIRROR ARRAYS

REFERENCE TO RELATED APPLICATION

This application claims the benefit of U.S. provisional patent application Ser. No. 61/551,050 filed 25 Oct. 2011 which is incorporated herein by reference. This application is a §371 of international patent application no. PCT/CA2012/000854 filed 13 Sep. 2012 which is also incorporated herein by reference and which claims priority from U.S. provisional patent application Ser. No. 61/551,050 filed 25 Oct. 2011.

TECHNICAL FIELD

This disclosure pertains to mechanisms for redirecting light, particularly sunlight.

BACKGROUND

WO 2009/000070, which is incorporated herein by reference, describes a sunlight redirector in which longitudinally adjacent plane mirrors are pivotally interconnected by non-stretching linkages to form a columnar array (see FIG. 1 hereof). The non-stretching linkages constrain movement of the mirrors such that their normal vectors remain parallel. Pivotable couplings (not shown in FIG. 1 hereof, but see WO 2009/000070) permit movement of the mirrors with respect to two mutually perpendicular axes and prevent movement of the mirrors with respect to a third axis which is perpendicular to the other two axes. Actuators (not shown in FIG. 1 hereof, but see WO 2009/000070) controllably move the mirrors to orient their normal vectors such that the mirrors reflect incident light in a desired direction. The actuators can be adaptively controlled to move the mirrors to track the sun, and thereby continually redirect sunlight into a specific direction, e.g. through a wall opening to illuminate the interior of a building.

Such mirror arrays are useful in building core daylight illumination systems, as explained in WO 2009/000070. It is desirable that such mirror arrays be thin, to facilitate mounting the arrays on or within building walls. A thin mirror array can be formed from a large number of small mirrors. However, a disadvantage of this approach is that the required number of mirrors increases in inverse proportion to the square of the thickness of the array, potentially prohibitively increasing the cost of constructing a suitably thin array. This disclosure addresses that disadvantage.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIG. 5A depicting substantially parallel alignment of the segments in each pair; FIG. 5B depicting alignment of one segment in each pair in a direction substantially parallel to a dominant direction of incident sunlight rays; FIG. 5C depicting alignment of the outward segments to direct incident light onto adjacent inward segments; and FIG. 5D depicting alignment of the inward segments to direct incident light onto adjacent outward segments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
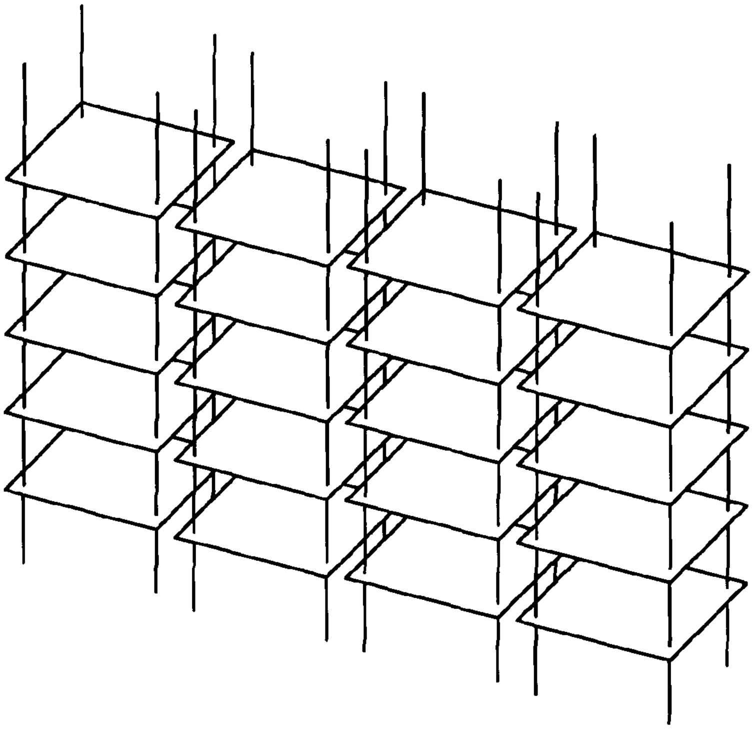
FIGURE 1 (PRIOR ART)
FIG. 1 isometrically and schematically depicts a prior art mirror array as disclosed in WO 2009/000070.
Figure 2:
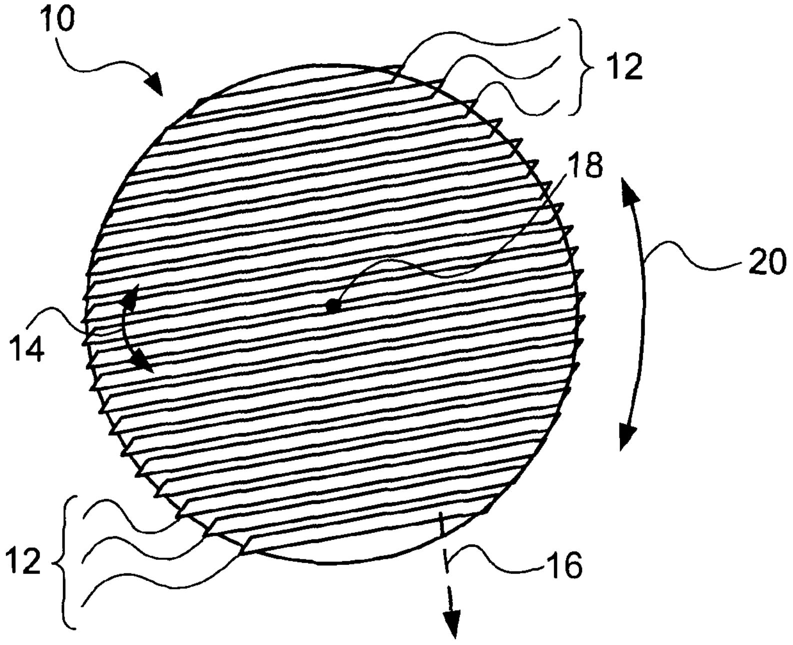
FIG. 2 is a front elevation depiction of a circularly rotatable mirror array having a plurality of longitudinal, pivotable mirrors.

FIG. 2 depicts a sunlight redirector 10 having a plurality of substantially parallel, uniformly spaced, longitudinal mirror segments 12. Segments 12 are interconnected (not shown) in a manner similar to that used to interconnect Venetian blind slats. A controller (not shown) coupled to one or more of segments 12 can be selectably actuated to simultaneously pivot all of segments 12, as indicated by double-headed arrow 14. Segments 12 can thus be pivotally adjusted, in the manner of a Venetian blind, such that their respective normal vectors 16 remain parallel. Segments 12 are of differing lengths, and are arranged such that sunlight redirector 10 has a circular front elevational shape as seen in FIG. 2. Sunlight redirector 10 is rotatable about its normal vector 18, as indicated by double-headed arrow 20.

Sunlight redirector 10 can thus be rotated to track the sun's azimuthal motion relative to the array's normal vector 18, and segments 12 can be pivotally adjusted to compensate for changes in the sun's altitude, so that light rays reflected by segments 12 will be redirected in a desired, fixed direction, e.g. substantially parallel to normal vector 18 to facilitate redirection of light rays through a wall opening to illuminate the interior of a building.

Figure 3A:
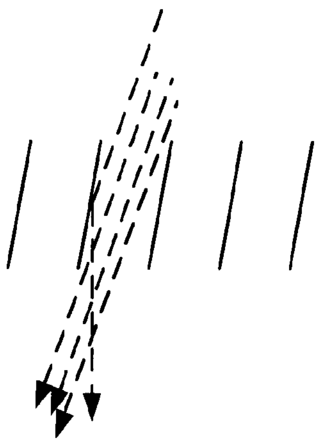
FIGS. 3A, 3B and 3C are side elevation schematic depictions of several interconnected longitudinal mirror segments, respectively depicting positioning of the segments to achieve small, intermediate and large angular redirection of incident light rays.
Figure 3B:
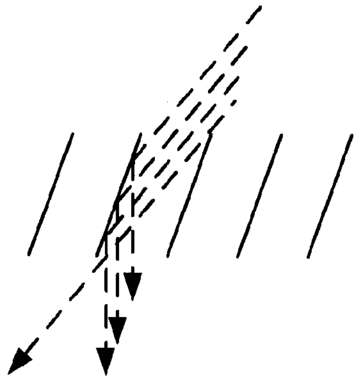
Figure 3C:
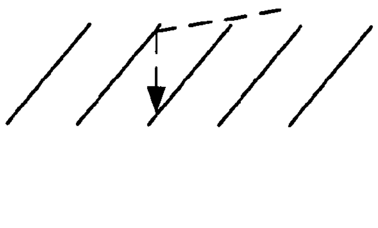

FIGS. 3A, 3B and 3C illustrate a potential disadvantage of using sunlight redirector 10's segments 12 to redirect light—redirection efficiency depends on the desired redirection angle. FIG. 3A depicts a small redirection angle situation in which the mirror segments (represented by solid lines) are nearly parallel to the incident light, so most rays (represented by dashed lines) do not strike the mirrors and are therefore not redirected as desired. FIG. 3B depicts an intermediate situation in which the mirror segments are obliquely angled relative to the incident light, with most rays striking the mirrors and being redirected as desired. FIG. 3C depicts a situation in which the desired redirection angle is so large that the mirror segments are positioned at such a large oblique angle relative to the incident light that most rays which strike the mirrors are redirected onto an adjacent mirror, then further redirected away from the desired direction. The FIGS. 3A and 3C situations are problematic since it is desirable to redirect rays corresponding to a wide range of sun angles.

Figure 4:
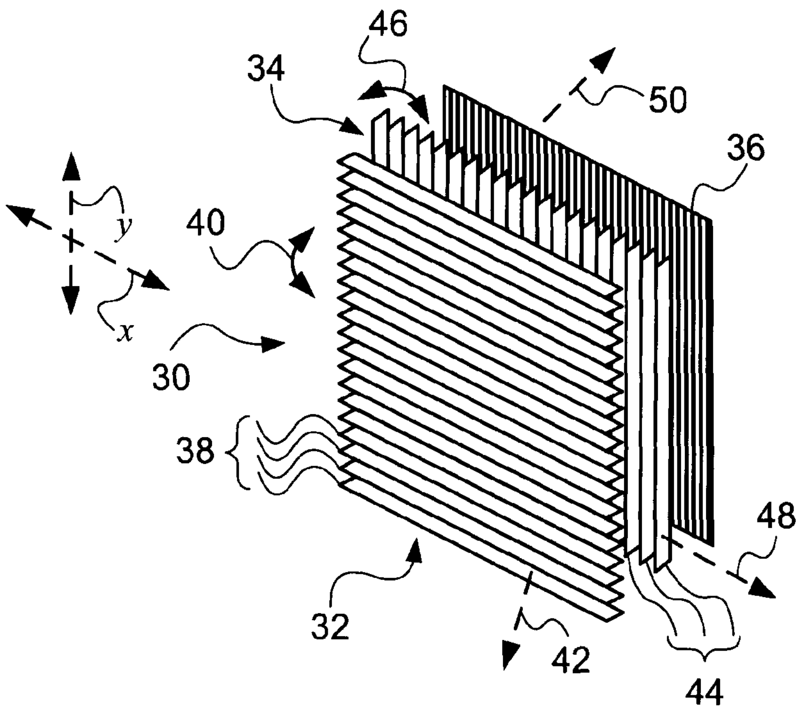
FIG. 4 isometrically depicts a rectangular mirror array having a first plurality of longitudinal, pivotable mirrors, a second plurality of longitudinal, pivotable mirrors which extend substantially perpendicular to the first plurality mirrors, and a prismatic sheet.

Another potential disadvantage of sunlight redirector 10 is possible increased complexity and cost in rotatably moving sunlight redirector 10 about normal vector 18. FIG. 4 depicts a stationary sunlight redirector 30 which addresses the foregoing potential disadvantages.

Stationary sunlight redirector 30 has a first mirror array 32, a second mirror array 34 and a prismatic sheet 36. First mirror array 32 is formed of a first plurality of substantially parallel, uniformly spaced, longitudinal mirror segments 38. Segments 38 are mirrored on either one or both sides, depending on the expected range of directions of the incident sunlight; and are interconnected (not shown) in a manner similar to that used to interconnect Venetian blind slats. A controller (not shown) coupled to one or more of segments 38 can be selectably actuated to simultaneously pivot all of segments 38, as indicated by double-headed arrow 40. Segments 38 can thus be pivotally adjusted, in the manner of a Venetian blind, such that their respective normal vectors 42 remain parallel. Segments 38 are of equal lengths, and are arranged such that first mirror array 32 has a rectangular front elevational shape as seen in FIG. 4.

Second mirror array 34 is formed of a second plurality of substantially parallel, uniformly spaced, longitudinal mirror segments 44. Segments 44 are mirrored on either one or both sides, depending on the expected range of directions of the incident sunlight; and are interconnected (not shown) in a manner similar to that used to interconnect Venetian blind slats. A controller (not shown) coupled to one or more of segments 44 can be selectably actuated to simultaneously pivot all of segments 44, as indicated by double-headed arrow 46. Segments 44 can thus be pivotally adjusted, in the manner of a Venetian blind, such that their respective normal vectors 48 remain parallel. Segments 44 are of substantially equal lengths, and are arranged such that second mirror array 34 has a rectangular front elevational shape as seen in FIG. 4.

First mirror array 32 is positioned in front of and in close proximity to second mirror array 34 with mirror segments 38 extending in a first direction x, and mirror segments 44 extending in a second direction γ which is substantially perpendicular to the first direction x. Prismatic sheet 36 is positioned behind and in close proximity to second mirror array 34.

First mirror array 32 can be pivotally adjusted to compensate for changes in the sun's altitude such that light rays reflected by segments 38 are redirected in a desired, fixed direction, e.g. toward prismatic sheet 36. Second mirror array 34 can be pivotally adjusted to compensate for changes in the sun's azimuth such that light rays reflected by segments 44 are also redirected in a desired, fixed direction, e.g. toward prismatic sheet 36.

Light rays redirected toward prismatic sheet 36 by either of first or second mirror arrays 32, 34 are refracted (i.e. redirected) by prismatic sheet 36 into a final desired fixed direction substantially parallel to the normal vector 50 of sunlight redirector 30. For example, the final desired fixed direction can be such that the rays are redirected through a wall opening to illuminate the interior of a building. Light rays redirected by first and second mirror arrays 32, 34 are efficiently redirected by prismatic sheet 36. Neither first mirror array 32 alone, nor second mirror array 34 alone, will efficiently redirect sunlight rays in situations where very little redirection is required. This corresponds to the disadvantage depicted in FIG. 3A. Prismatic sheet 36 compensates by imparting further substantial redirection of the light rays in such situations, thus improving efficiency. For example, without prismatic sheet 36, sunlight redirection efficiency of an array mounted on a south wall would be very low while the sun is due south.

The side of prismatic sheet 36 facing toward second mirror array 34 may be flat. The opposite side of prismatic sheet 36 may bear a large plurality of vertically extending 70° internal whole angle isosceles triangle prisms. Sheet 36 can be formed of a transparent polymeric material such as polycarbonate (PC), polyethyleneterephthalate (PET), poly methyl methacrylate (PMMA), or a combination of PC, PET and/or PMMA. 2370 optical lighting film available from 3M, St. Paul, Minn. can be used to form sheet 36. The precise angle and size of the film's prisms is not highly critical—generally the desired characteristic is that light rays that are oriented roughly 30° (between 10° and 50°) to the left or to the right of perpendicular will be efficiently refracted by the film into a direction which is substantially perpendicular to the macroscopic plane of sheet 36. Consequently, light rays redirected by first and second mirror arrays 32, 34 do not need to be perpendicular to sunlight redirector 30 as a whole—which in any case is a difficult constraint to satisfy at times near solar noon.

Although sheet 36 improves sunlight redirector 30's efficiency for problematic sun angles (e.g. at times near solar noon), it may not satisfactorily accommodate all desired light redirection angles. Furthermore, light refracted through sheet 36 may be redirected in slightly different directions, depending on the wavelength of the incident light. These disadvantages can be circumvented as discussed below in relation to FIGS. 5A-5D.

FIGS. 5A-5D each depict four pairs of longitudinal inward/outward mirror segments 60A, 60B; 62A, 62B; 64A, 64B; and 66A, 66B (represented by solid lines). Each mirror segment 12 in sunlight redirector 10 may be one such pair of inward/outward segments. Similarly, each mirror segment 38 and/or each mirror segment 44 in sunlight redirector 30 may be one such pair of inward/outward segments. Mirror segments 60A, 60B; 62A, 62B; 64A, 64B; and 66A, 66B are mirrored on both sides.

Figure 5A:
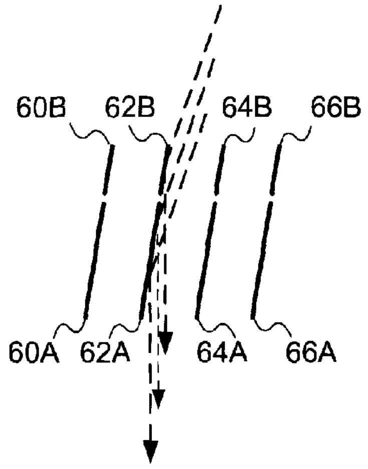
FIGS. 5A, 5B, 5C and 5D are side elevation schematic depictions of four pairs of longitudinal mirror segments.
Figure 5B:
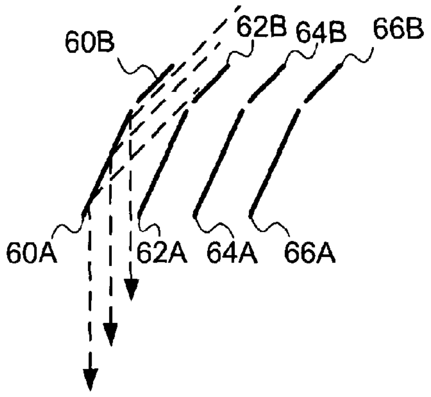
Figure 5C:
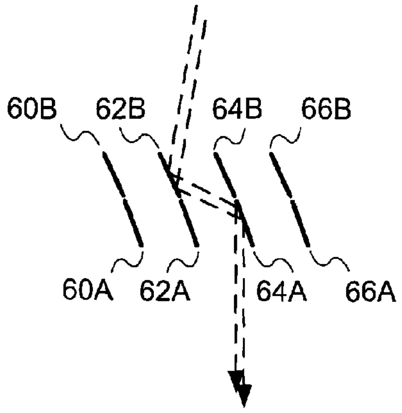
Figure 5D:
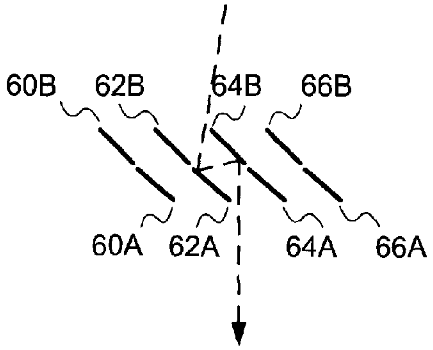

Outward segments 60B, 62B, 64B and 66B are adjustable with respect to inward segments 60A, 62A, 64A and 66A respectively. FIG. 5A depicts adjustment to align the inward and outward segments in each pair substantially parallel to one another. FIG. 5B depicts adjustment of the segments to align the outward segment in each pair in a direction which is substantially parallel to the dominant direction of incident sunlight rays (depicted as dashed arrows in FIGS. 5A-5D). FIG. 5C depicts adjustment of the segments such that incident light rays are first reflected by the outward segments onto the adjacent inward segments, then further reflected in the desired direction by the inward segments. FIG. 5D depicts adjustment of the segments such that incident light rays are first reflected by the inward segments onto the adjacent outward segments, then further reflected in the desired direction by the outward segments.

The different segment adjustment configurations depicted in FIGS. 5A-5D yield different light redirection efficiencies which depend on factors such as the segments' sizes and the incident light angle. The segments can be automatically selectably adjusted by a suitable control system to adopt any of the depicted adjustment configurations (or any desired intermediate adjustment configuration) in order to maximize light redirection efficiency at different times. Generally, the best choice at any particular time will be the adjustment configuration that minimizes total loss of useful light rays (i.e. light rays which pass through the sunlight redirector without being redirected are "lost" in the sense that they are not redirected into the desired direction). In all cases, the inward/outward mirror segments are adjustably positioned taking into account both the sunlight incidence angle and the desired direction into which the light rays are to be redirected. The required mirror segment positions can be readily determined for any selected sunlight incidence angle by well known ray trace analysis techniques. The so-determined mirror segment position data can be stored in a look-up table or emulated in various forms of open loop mathematical algorithms or feed-back-based closed loop algorithms, or some combination thereof. Such look-up table and algorithmic techniques are well known to persons skilled in the art. In some cases, the FIG. 4 stationary sunlight redirector 30 can be formed without prismatic sheet 36, if mirror segments 38 and/or 44 are suitably formed of inward/outward segments as aforesaid.

The scope of the claims should not be limited by the preferred embodiments set forth herein, but should be given the broadest interpretation consistent with the description as a whole.

The invention claimed is:

1. A sunlight redirector, comprising:

a first mirror array having a first plurality of substantially parallel, uniformly spaced, longitudinal mirror segments;

a second mirror array having a second plurality of substantially parallel, uniformly spaced, longitudinal mirror segments; and a prismatic sheet;

wherein:

the first mirror array is positioned in front of and in close proximity to the second mirror array;

the prismatic sheet is positioned behind and in close proximity to the second mirror array;

the first plurality of mirror segments extend in a first direction (x); and the second plurality of mirror segments extend in a second direction (y) substantially perpendicular to the first direction (x).

2. A sunlight redirector as defined in claim 1, wherein:

each one of the first plurality of mirror segments has a normal vector;

each one of the second plurality of mirror segments has a normal vector;

the first plurality mirror segments are interconnected for simultaneous pivotal movement of the first plurality segments, such that the normal vectors of the first plurality mirror segments remain parallel; and the second plurality mirror segments are interconnected for simultaneous pivotal movement of the second plurality segments, such that the normal vectors of the second plurality mirror segments remain parallel.

3. A sunlight redirector as defined in claim 2, wherein:

the first plurality mirror segments are of substantially equal length and are arranged such that the first mirror array is rectangular; and the second plurality mirror segments are of substantially equal length and are arranged such that the second mirror array is rectangular.

4. A sunlight redirector as defined in as defined in claim 3, wherein:

the first mirror array redirects incident light rays toward the prismatic sheet;

the second mirror array redirects incident light rays toward the prismatic sheet; and the prismatic sheet redirects light rays into a desired fixed direction substantially parallel to a normal vector of the sunlight redirector.

5. A sunlight redirector as defined in claim 3, wherein:

at least some of the mirror segments each further comprise an inward mirror segment and an outward mirror segment; and the inward and outward mirror segments are adjustably positionable to maximize redirection of incident sunlight rays in a desired direction.

6. A sunlight redirector as defined in claim 2, wherein:

each one of the first plurality of mirror segments further comprises an inward mirror segment and an outward mirror segment;

each one of the second plurality of mirror segments further comprises an inward mirror segment and an outward mirror segment;

each one of the outward mirror segments is adjustable between:

a first position in which each one of the outward mirror segments is substantially parallel to a corresponding one of the outward mirror segments; and a second position in which each one of the outward mirror segments is substantially parallel to an incident sunlight direction.

7. A sunlight redirector as defined in as defined in claim 2, wherein:

the first mirror array redirects incident light rays toward the prismatic sheet;

the second mirror array redirects incident light rays toward the prismatic sheet; and the prismatic sheet redirects light rays into a desired fixed direction substantially parallel to a normal vector of the sunlight redirector.

8. A sunlight redirector as defined in claim 2, wherein:

at least some of the mirror segments each further comprise an inward mirror segment and an outward mirror segment; and the inward and outward mirror segments are adjustably positionable to maximize redirection of incident sunlight rays in a desired direction.

9. A sunlight redirector as defined in as defined in claim 1, wherein:

the first mirror array redirects incident light rays toward the prismatic sheet;

the second mirror array redirects incident light rays toward the prismatic sheet; and the prismatic sheet redirects light rays into a desired fixed direction substantially parallel to a normal vector of the sunlight redirector.

10. A sunlight redirector as defined in claim 9, wherein the prismatic sheet:

has a flat side facing toward the second mirror array; and has an opposite side bearing a large plurality of vertically extending 70° internal whole angle isosceles triangle prisms.

11. A sunlight redirector as defined in claim 9, wherein the prismatic sheet is formed of a transparent polymeric material such as polycarbonate (PC), polyethyleneterephthalate (PET), polymethyl methacrylate (PMMA), or a combination of PC, PET and/or PMMA.

12. A sunlight redirector as defined in claim 9, wherein:

at least some of the mirror segments each further comprise an inward mirror segment and an outward mirror segment; and the inward and outward mirror segments are adjustably positionable to maximize redirection of incident sunlight rays in a desired direction.

13. A sunlight redirector as defined in claim 1, wherein:

at least some of the mirror segments each further comprise an inward mirror segment and an outward mirror segment; and the inward and outward mirror segments are adjustably positionable to maximize redirection of incident sunlight rays in a desired direction.

14. A sunlight redirector, comprising:

a first mirror array having a first plurality of substantially parallel, uniformly spaced, longitudinal mirror segments; and a second mirror array having a second plurality of substantially parallel, uniformly spaced, longitudinal mirror segments;

wherein:

the first mirror array is positioned in front of and in close proximity to the second mirror array;

the first plurality of mirror segments extend in a first direction (x);

the second plurality of mirror segments extend in a second direction (y) substantially perpendicular to the first direction;

at least some of the mirror segments each further comprise an inward mirror segment and an outward mirror segment; and the inward and outward mirror segments are adjustably positionable to maximize redirection of incident sunlight rays in a desired direction.

* * * * *